United States Patent [19]

Thomas

[11] Patent Number: 5,625,952
[45] Date of Patent: May 6, 1997

[54] CUTTING TOOLS

[76] Inventor: Raymond D. Thomas, 8 Darryl St., Bulleen Victoria 3105, Australia

[21] Appl. No.: 433,450

[22] PCT Filed: Nov. 9, 1993

[86] PCT No.: PCT/AU93/00578

§ 371 Date: Jun. 6, 1995

§ 102(e) Date: Jun. 6, 1995

[87] PCT Pub. No.: WO94/10829

PCT Pub. Date: May 26, 1994

[30] Foreign Application Priority Data

Nov. 9, 1992 [AU] Australia .................. PL 5726

[51] Int. Cl.$^6$ .................................................. B26B 13/00
[52] U.S. Cl. ................................. 30/262; 30/254
[58] Field of Search ........................ 30/258, 262, 254

[56] References Cited

U.S. PATENT DOCUMENTS 2,504,766  4/1950  Vosbikian ...................... 30/262
2,563,590  8/1951  Dolansky ....................... 30/262
4,947,553  8/1990  Bendickson et al. ........... 30/262
4,980,975  1/1991  Hodson .......................... 30/262

FOREIGN PATENT DOCUMENTS 612104  1/1961  United Kingdom ............ 30/262

*Primary Examiner*—Hwei-Siu Payer
*Attorney, Agent, or Firm*—Sheridan Ross P.C.

[57] ABSTRACT

An improved locking mechanism for a cutting tool (1) is disclosed. The locking mechanism includes a locking block (15) transversely located through or on one handle (12) of the cutting tool (1). The locking mechanism incorporates a shaped spring (18) adapted to restrain the locking block (15) in either the locked or unlocked position.

A cutting tool (1) having a pair of handles (11,12) operable to move at least one cutting blade relative to a second cutting blade or anvil and including the locking mechanism described is also disclosed.

16 Claims, 4 Drawing Sheets

CUTTING TOOLS

BACKGROUND OF THE INVENTION

The present invention relates to improvements to cutting tools and is applicable to such cutting tools of the configurations known as bypass and anvil. More particularly, this invention involves in one embodiment a locking mechanism which is adapted to secure the cutting blade(s) of a cutting tool in a closed, and therefore safe position.

It is well known that cutting tools of the type to which the present invention relates have at least one sharp cutting blade and therefore should be provided with some form of restraining device to keep the cutting edge so positioned as to prevent accidental injury when the Cutting tool is not in use. Locking mechanisms are known which require manipulation of a lever, pawl or sliding device, which engages and disengages a pawl, pin or bolt which is so positioned as to prevent the sharp cutting edge from becoming exposed when the cutting tool is not in use.

Such devices may be moved to disengage the locking mechanism inadvertently due to the operating device being so positioned as to require the placement of the hand and or finger of the operator in a similar position for both locking and unlocking the sharp cutting blade.

However, there exists a need to provide a novel locking mechanism adapted to operate the locking mechanism from one conveniently accessible location on the cutting tool and to unlock the mechanism from a conveniently accessible location which is remote from the location of the locking action location and thereby requiring a different hand and or finger movement to reverse the locking action.

SUMMARY OF THE INVENTION

It is therefore an object of the present invention to provide, in one embodiment, a novel locking mechanism for a cutting tool capable of or at least partially capable of fulfilling the aforementioned needs.

The present invention accordingly provides in one embodiment a locking mechanism for a cutting tool, said mechanism being operable to resist exposure of a cutting edge of said tool and including a locking block transversely located through or on a handle of a first blade of the cutting tool, said locking block movable between a locked position and an unlocked position in a direction transverse to the plane of rotation of the blade and incorporating a shaped spring adapted to restrain the locking block in either the locked or unlocked position.

The locking block is preferably recessed to receive the spring. The locking block may be movable relative to the spring between the locked and unlocked positions.

In another embodiment, the present invention provides a cutting tool having a pair of handles operable in scissor fashion to move at least one cutting blade relative to a second cutting blade or anvil and including a locking mechanism according to the present invention. The locking mechanism may extend transversely through one of the handles and may be operable to resist the opening of the handles and hence exposure of a cutting edge of the tool when locked in a closed position.

The term "cutting tool" is used herein in a broad sense to refer to any form of cutting hand-tool operable by one hand via a pair of handles movable in a scissor action. The term accordingly includes, but is not limited to, secateurs, pruners of the by-pass (shearing) type, pruners of the anvil type, garden clippers, tin snips, scissors and domestic shears.

In one embodiment of the invention, the locking block is provided with an aperture such as an interruption or gap which permits a portion or part of a second cutting blade of the tool to pass through the aperture when the locking block is moved to the unlocked position. The locking block may likewise restrain the second cutting blade from moving to a position which exposes a cutting edge of the tool when the tool is closed and the locking block moved to the locked position. This may be achieved by a portion of the locking block engaging into a register notch provided within the configuration of the second cutting blade.

The locking block is preferably located in or on the lower handle but it may also be effectively and operationally located in or on the upper handle of a cutting tool according to the present invention. A locking block according to the invention may be in the form of a bar, block, bolt or other form capable of performing the functions described.

As noted, the locking block extends in a direction transversely through or on a handle of a first cutting blade of the cutting tool. Preferably the locking block extends transversely to the longitudinal axis of the handle or blade on which it is mounted, or in other words transversely to the plane of rotation of the first cutting blade. The locking block preferably extends in a direction which is substantially normal to the longitudinal axis of the handle or blade on which it is mounted, or in other words in a direction substantially normal to the plane of rotation of the cutting blade.

The shaped locating spring may be formed from any practical geometric cross section spring material which fulfills its intended function. Preferably the spring is of a rectangular cross section, but it is not necessarily restricted thereto.

The spring may be retained in its operating position by the profile being so shaped as to be retained in its operational location by engagement of a part of the profile into a cavity provided for the purpose within a handle of the cutting tool. In another embodiment, the spring may be retained in its operating position by the spring profile being so shaped as to engage with the outer surfaces of the handle. In yet another embodiment, the spring may be retained in its functional location by means of a locating and retaining pin or screw inserted into the handle for that purpose.

In one preferred embodiment, the locking block and spring include complementary interengaging projections and recesses corresponding to the unlocked and locked positions of the tool, whereby corresponding ones of the projections and recesses interengage to define a locked or unlocked position on movement of the locking block relative to the spring to one of the positions. The recess of the locking block may include positioning ridges to match part of the profile of the spring, corresponding to the locked and unlocked positions of the tool. The positioning ridges may include arcuate surfaces to engage and retain complementary shaped projections or wings on the spring on movement of the locking block relative to the spring to one or other of the positions.

Other variations to the shape of the locking block, locating spring and cutting blade register notch are also envisaged within the scope of the present invention.

A further feature desirable for the safe operation of cutting tools of the type to which the present invention relates is that the cutting tool cannot be locked with a cutting edge in the open position. This feature may be readily provided in a cutting tool according to the present invention. For this purpose a sloping face but not restricted to a planar face may accordingly be provided within the configuration of either or both the locking block and the cutting blade or cutting blade holder. The sloping face may be positioned and arranged to ensure that the locking block is moved to the "open" position to allow cutting blade closure if the handles are operated to close the cutting blades with the locking block in the "lock" position. This arrangement facilitates proper closure and locking even where the locking block is inadvertently moved to the "lock" position when the cutting blades are open.

DETAILED DESCRIPTION OF PREFERRED EMBODIMENT

Figure 1:
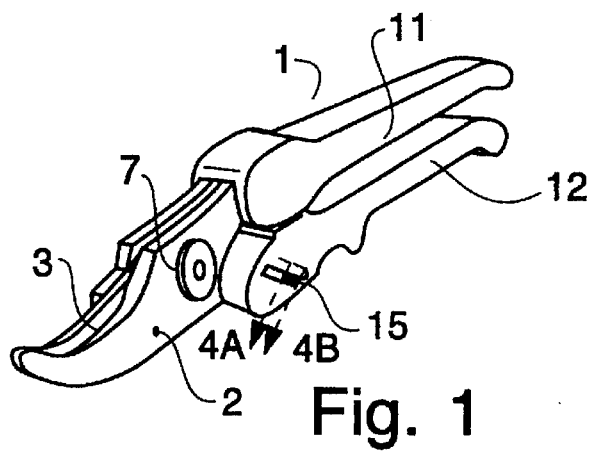

To further assist in the understanding of the present invention, particularly preferred embodiments of the invention will now be described in relation to the accompanying drawings.

Figure 2:
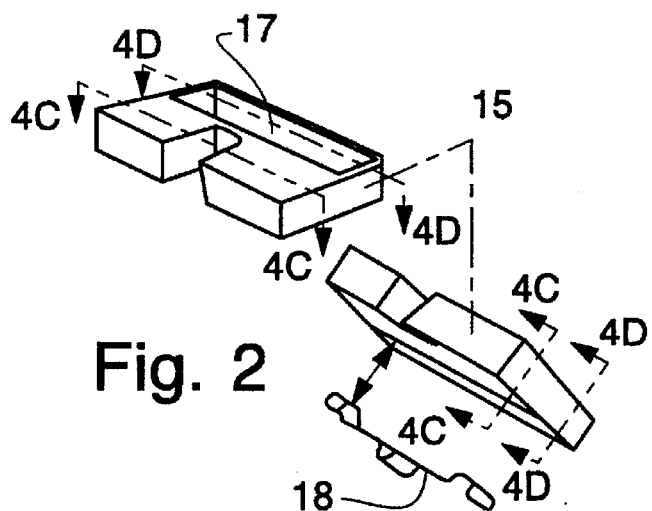
Figure 3:
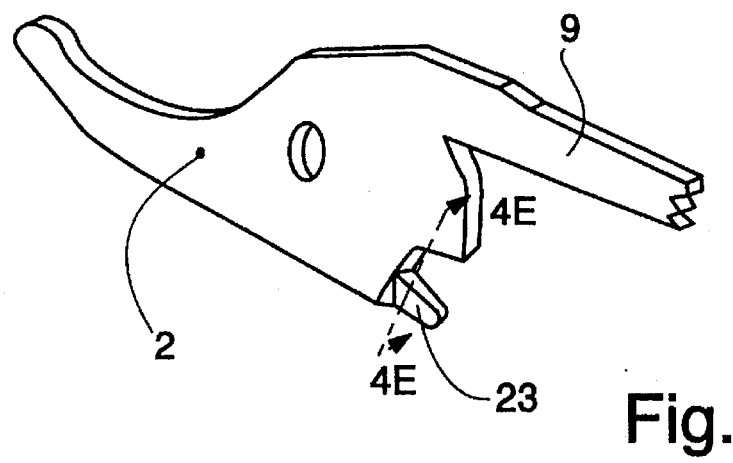
Figures 4A, 4B:
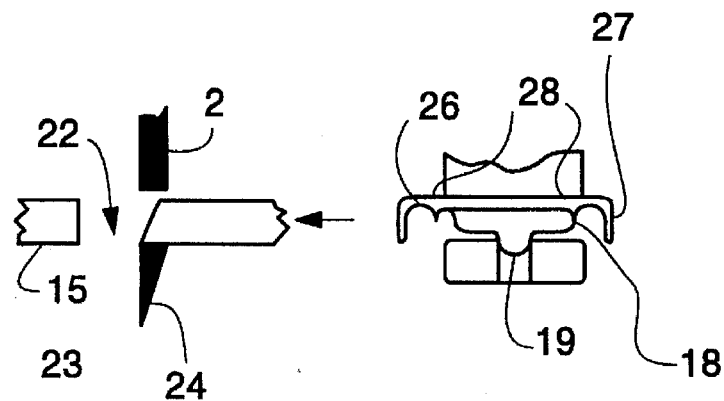
Figures 4C, 4D:
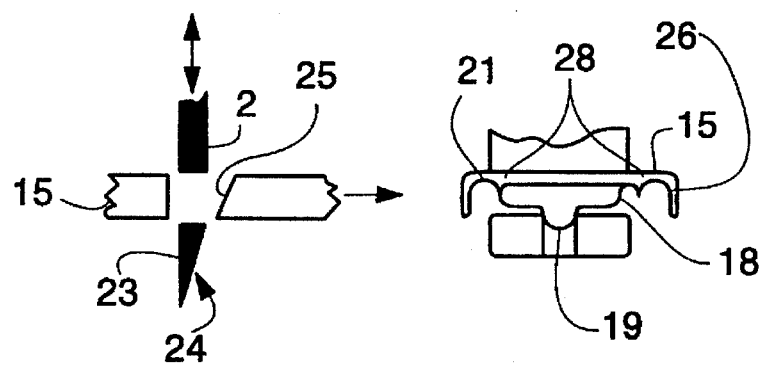
Figures 4E, 4F:
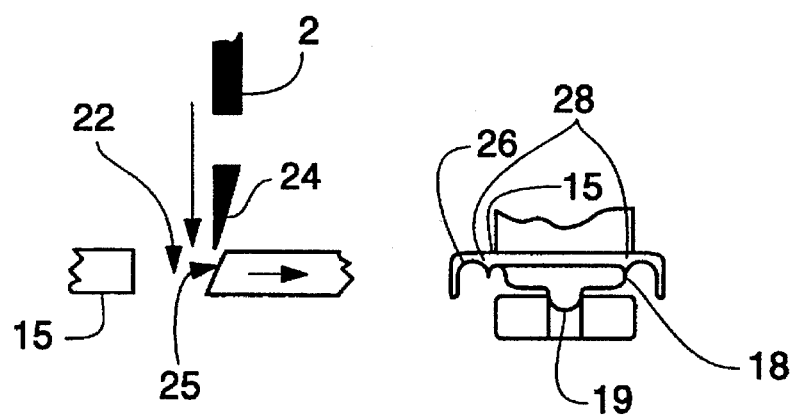
Figure 5:
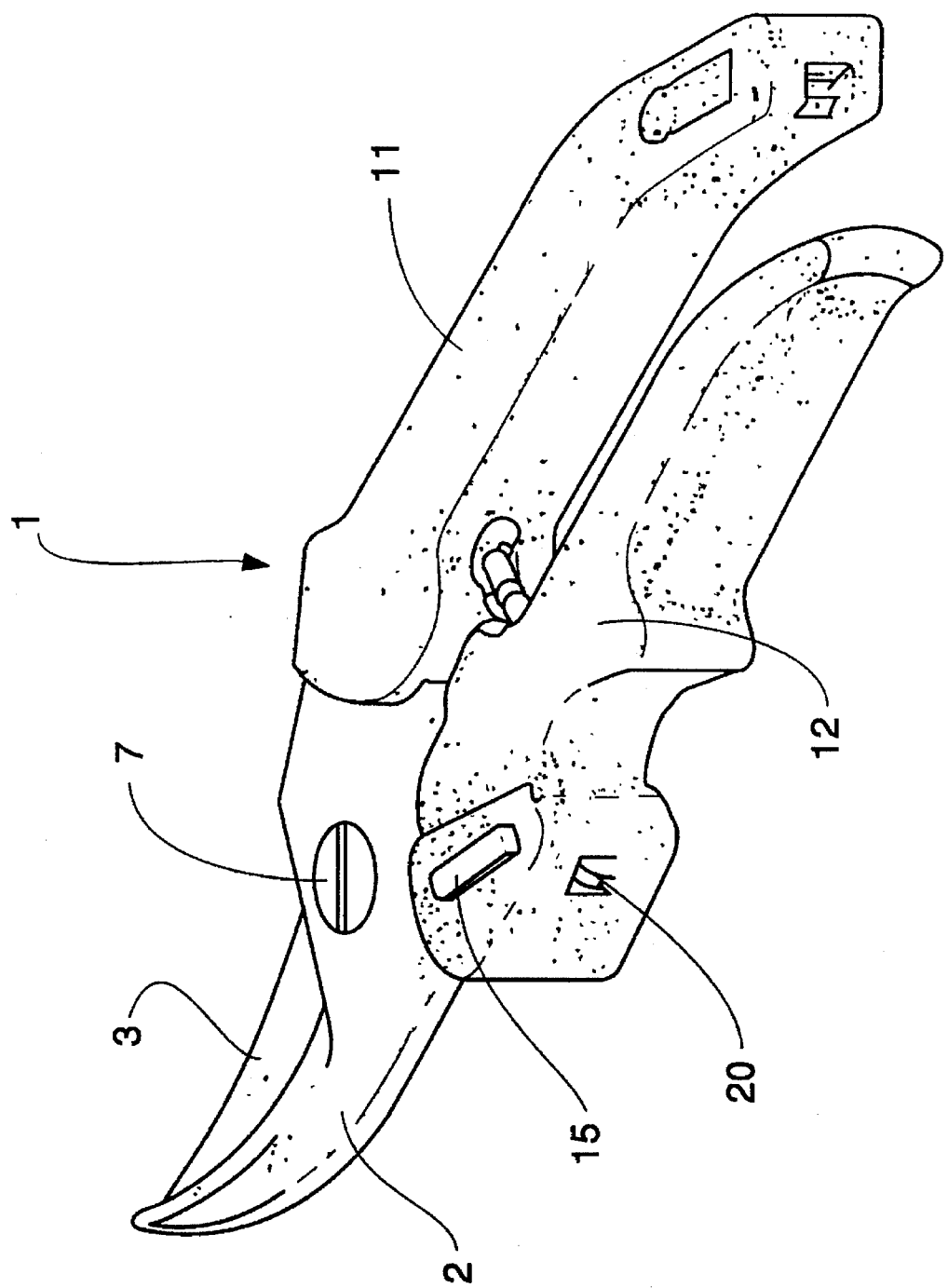
Figure 6:
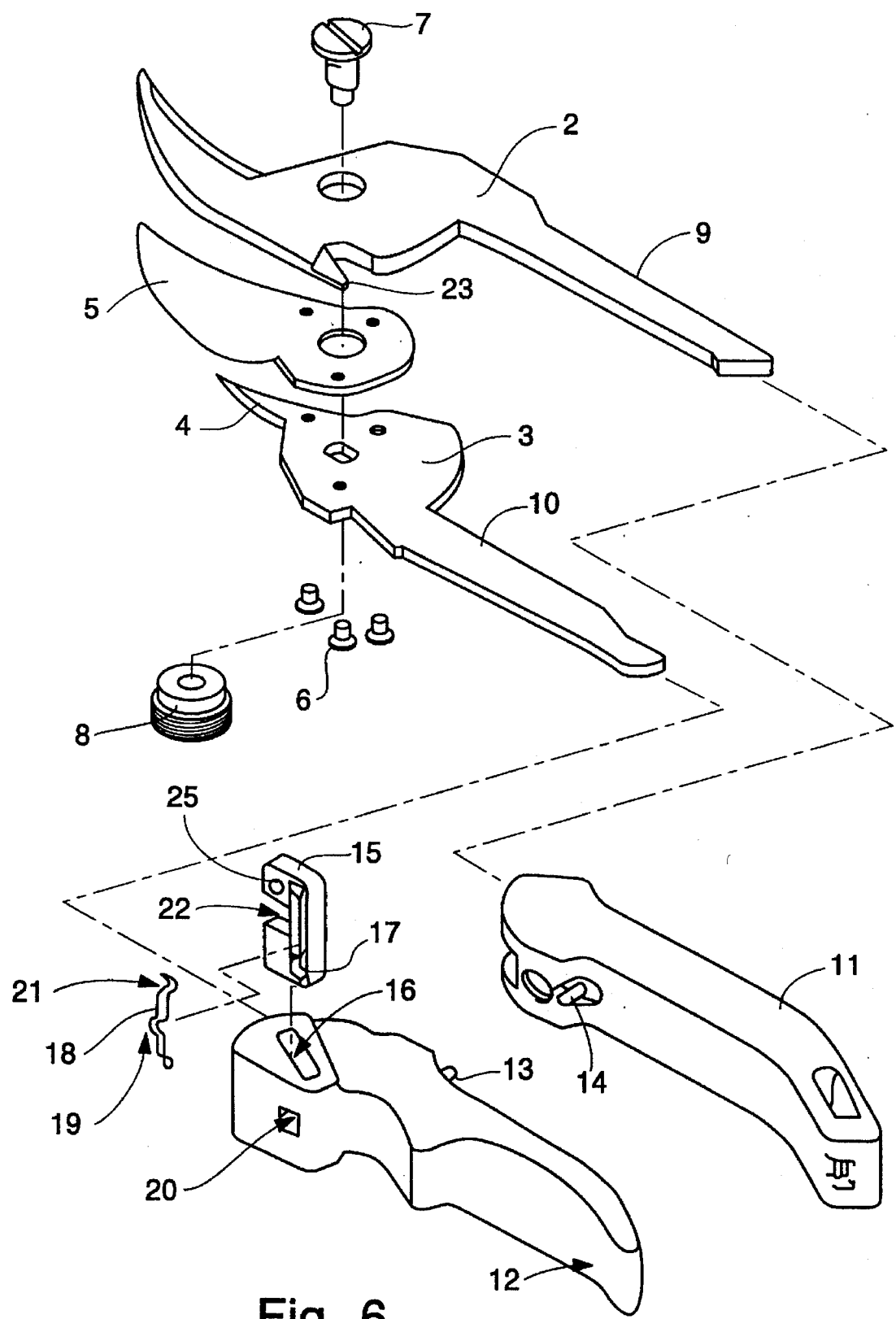

In the drawings:

FIG. 1 comprises a perspective view of a cutting tool comprising a bypass pruner according to a first embodiment of the present invention;

FIG. 2 comprises two perspective views of the locking block according to a first embodiment of the present invention;

FIG. 3 comprises a perspective view of a lower cutting blade of a bypass pruner showing the register notch and the planar face referred to herein;

FIGS. 4a and 4b comprises cross-sectional views of the locking block of FIG. 2 taken along the lines 4c—4c and 4d—4d and showing the relative positions of the cutting blade or cutting blade holder, locking block and spring at section 4c—4c and 4d—4d when the locking block is in the "lock" position;

FIG. 4c and 4d comprises cross-sectional views as in FIG. 4a and 4b showing the relative positions of the cutting blade or cutting blade holder, locking block and spring at sections 4c—4c and 4d—4d when the locking block is in the "open" position;

FIGS. 4e and 4f comprises cross-sectional views as in FIGS. 4a and 4b showing the relative positions of the cutting blade or cutting blade holder, locking block and spring at sections 4c—4c and 4d—4d when the locking block is in the "lock" position and the cutting blade or cutting blade holder is in the "open" position;

FIG. 5 is a perspective view of a cutting tool according to a second embodiment of the present invention; and FIG. 6 is an exploded perspective view of the cutting tool FIG. 5.

in the drawings in which like features are designated by the same numeral a cutting tool 1 is shown having a first cutting blade 2 and a second cutting blade 3. The embodiments shown is the drawings both relate to cutting tools operable by scissor action of the bypass type although the invention is also applicable to cutting tools of the anvil type.

Cutting blade 3 comprises a cutting blade hold 4 having a removable cutting edge member 5 which may be removably attached via attachment means 6 which may comprise screws, rivets or other fastening means known in the art.

Cutting blades 2 and 3 may be held together in known fashion so as to be operable by a scissor action via a screw 7 and an associated nut 8.

Cutting blades 2 and 3 include handle portions 9 and 10 respectively. Handle portions 9 and 10 are an integral part of cutting blades 2 and 3 in the embodiment illustrated.

Handles 11, 12 may be slipped over handle portion 9, 10. Handles 11, 12 may include stop means 13, 14 to stop handles 11, 12 from coming together beyond a predetermined position. Although handles 11, 12 are shown as separate components in the embodiment illustrated it is to be appreciated that handles 11, 12 may be formed integrally with cutting blades 2, 3 respectively.

As best seen in FIG. 5 locking block 15 extends generally transversely through aperture 16 in lower handle 12, that is to say, generally transversely to the longitudinal axis of handle 12 or blade 3, or in other words transversely to the plane of rotation of blade 3. Locking block 15 preferably extends in a direction which is substantially normal to the longitudinal axis of handle 12 or blade 3, or in other words substantially normal to the plane of rotation of blade 3.

Locking block 15 is a substantially rectangular block having an elongated recess 17 for receiving spring means 18. Spring means 18 includes positioning lug 19 in the form of a projection adapted for engaging location aperture 20 in lower handle means 12. Spring means 18 also includes locating wings 21 for locating the spring means 18 within slot 17 via positioning ridges adapted for retaining spring means 18 in either the locked or unlocked position relative to the locking block 15 until a pressure above a threshold limit is applied to locking block 15.

As best seen in FIGS. 4a, 4b and 4c, locking block 15 includes positioning ridges 28. Arcuate surfaces 26 disposed at either end in the recess of locking block 15 are defined between positioning ridges 28 and extremities 27 of locking block 15. Arcuate surfaces 26 receive corresponding ones of complementary shaped wings 21 of spring means 18 on movement of locking block 15 relative to spring means 18 between the locked position of FIG. 4a and the unlocked position of FIG. 4b.

Locking block 15 includes gap 22 which as best seen in FIG. 4b enables lug 23 to pass freely through gap 22 when locking block 15 is in the open position.

In the preferred embodiments illustrated, lug 23 and gap 22 both include sloping faces 24 and 25 respectively which are adapted to urge the locking block 15 to the open position as cutting blades 2,3 are closed if the locking block 15 is inadvertently moved to the locked position with the cutting blades 2 and 3 open.

As can be best appreciated from FIGS. 1 and 5, a locking block 15 may be conveniently positioned for use by either a right or left-handed operator. When the illustrated embodiments are used by a right-handed operator, locking block 15 may be conveniently moved by the thumb of the user holding handles 11, 12 to locate block 15 in the locked position shown in: FIG. 5. The locking block 15 and hence cutting blades 2, 3 may be unlocked by the forefinger of the right hand of a user holding handles 11, 12 pushing locking block 15 to the unlocked position. In the unlocked position locking block 15 will project from handle 12 until moved by the thumb of the user back to the locked position shown in FIG. 5.

This arrangement of pushing the locking block from opposite sides of a handle enables the locking mechanism provided according to the invention to be locked from a first convenient location and unlocked from a second convenient location remote from the first location. Such an arrangement is less likely to be inadvertently disengaged.

As can be appreciated from FIGS. 4a, 4b and 4c, spring means 18 may be located via projection 19 and recess 20 to remain in one position relative to handle 12. Thus by moving block 15 from the locked position shown in FIG. 4a to the open or unlocked position shown in FIG. 4b, locking block 15 is moved relative to stationary spring means 18 so that wings 21 of spring means 18 move from the locked position shown in FIG. 4a to the unlocked position shown in FIG. 4b by overcoming the threshold pressure applied by positioning ridges 28 within recess 17.

It will be appreciated by those skilled in the art that cutting tools and locking mechanisms made in accordance with the present invention should preferably be made from materials possessing strong, resilient and rust resisting properties. In this regard, various grades of steel and synthetic materials may be appropriate to particular components.

While it has been convenient to describe the invention herein in relation to particularly preferred embodiments, it is to be appreciated that other constructions and arrangements are also considered as falling within the scope of the invention. Various modifications, alterations, variations and/or additions to the constructions and arrangements described herein are also considered as falling within the ambit and scope of the present invention.

I claim:

1. A cutting tool having a pair of handles operable to move at least a first cutting blade relative to a second cutting blade or anvil and including a locking mechanism, wherein said locking mechanism includes a locking block transversely located through or on a handle of the first cutting blade, said locking block movable between a locked and an unlocked position in a direction transverse to the plane of rotation of the first cutting blade, said locking block being recessed to receive a shaped spring adapted to restrain the locking block in either the locked or unlocked position, wherein said locking block is movable relative to the spring, said locking block being apertured to permit part of the second cutting blade to pass through said aperture when the locking block is in the unlocked position.

2. A cutting tool according to claim 1 wherein said part of the second cutting blade is an outwardly projecting lug having a sloping face operable to urge the locking block from the locked position to the unlocked position as the cutting blades are closed with the locking block in the locked position.

3. A cutting tool according to claim 2 wherein the handle of the first cutting blade includes a locating aperture to engage a corresponding projection on the spring to retain the spring relative to movement of the locking block between the locked or unlocked positions.

4. A cutting tool according to claim 3 wherein said locking block is movable in a direction substantially normal to the plane of rotation of the first cutting blade.

5. A locking mechanism for a cutting tool, said mechanism being operable to resist exposure of a cutting edge of said tool and including a locking block transversely located through or on a handle of a first blade of the cutting tool, said locking block movable between a locked position and an unlocked position in a direction transverse to the plane of rotation of the blade and incorporating a shaped spring adapted to restrain the locking block in either the locked or unlocked position, and wherein the locking block is apertured to permit a portion of a second blade of said tool to pass through said aperture when the locking block is in the unlocked position.

6. A locking mechanism according to claim 1, wherein said locking block is movable in a direction substantially normal to the plane of rotation of the blade.

7. A locking mechanism according to claim 1, wherein the locking block is recessed to receive the spring.

8. A locking mechanism according to claim 4, wherein the locking block is movable relative to the spring between the locked and unlocked positions.

9. A locking mechanism according to claim 1, wherein the handle of the first blade of the cutting tool includes a locating aperture to engage a corresponding projection on the spring to retain the spring relative to movement of the locking block between the locked or unlocked positions.

10. A locking mechanism according to claim 7, wherein said locking block and said spring include complementary interengaging projections and recesses corresponding to said locked and unlocked positions, whereby corresponding ones of said projections and recesses interengage to define a locked or unlocked position on movement of the locking block relative to the spring to one of said positions.

11. A locking mechanism according to claim 8, wherein said spring includes a pair of wings engaging positioning ridges located within the spring recess of the locking block to retain the spring relative to movement of the locking block between the locked or unlocked positions.

12. A locking mechanism according to claim 6, wherein said second blade includes a lug positioned and arranged to pass through said aperture when the locking block is in the unlocked position whereby to operate the cutting tool and wherein when said locking block is in the locked position said lug contacts said locking block whereby to retain said blades in a closed position.

13. A locking mechanism according to claim 9, wherein said lug and said aperture include sloping faces operable to urge the locking block from the locked position to the unlocked position as the blades are closed with the locking block in the locked position.

14. A cutting tool including a locking mechanism according to claim 1.

15. A locking mechanism for a cutting tool, said mechanism being operable to resist exposure of a cutting edge of said tool and including a locking block transversely located through a handle of a first blade of the cutting tool, said locking block movable from a locked position to an unlocked position in a direction which is substantially normal to the plane of rotation of the blade and recessed to receive a shaped spring adapted to restrain the locking block in either the locked or unlocked position, and wherein the locking block is apertured to permit a portion of a second blade of said tool to pass through said aperture when the locking block is in the unlocked position.

16. A cutting tool including a locking mechanism according to claim 2.

* * * * *